(12) United States Patent
Ballantine et al.

(10) Patent No.: US 10,666,058 B2
(45) Date of Patent: May 26, 2020

(54) INTERGRATED FUEL CELL AND ENERGY STORAGE SYSTEMS AND METHOD OF OPERATING THEREOF (71) Applicant: BLOOM ENERGY CORPORATION, Sunnyvale, CA (US)

(72) Inventors: Arne Ballantine, Palo Alto, CA (US); Peter Gross, Sunnyvale, CA (US); Ranganathan Gurunathan, Bangalore (IN); Prasad Pmsvvsv, Sunnyvale, CA (US); Carl Cottuli, Franklin, MA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 359 days.

(21) Appl. No.: 15/172,758

(22) Filed: Jun. 3, 2016

(65) Prior Publication Data

US 2017/0005480 A1    Jan. 5, 2017

Related U.S. Application Data (60) Provisional application No. 62/171,145, filed on Jun. 4, 2015.

(51) Int. Cl.
*H02J 7/00* (2006.01)
*H02J 3/38* (2006.01)
(Continued)

(52) U.S. Cl.
CPC ......... *H02J 3/387* (2013.01); *H01M 8/04313* (2013.01); *H01M 10/46* (2013.01); *H01M 16/003* (2013.01); *H01M 16/006* (2013.01); *H02J 1/102* (2013.01); *H02J 3/32* (2013.01); *H02J 3/382* (2013.01); *H02J 7/34* (2013.01); *H01M 2010/4271* (2013.01); *H02J 7/345* (2013.01); *H02J 2300/30* (2020.01); *Y02E 70/30* (2013.01); *Y02P 90/40* (2015.11)

(58) Field of Classification Search
CPC .... H02J 3/387; H02J 1/102; H02J 3/32; H02J 3/382; H02J 7/345; H02J 2001/004; H02J 7/34; H01M 8/04313; H01M 10/46; H01M 16/003; H01M 16/006; H01M 2010/4271
USPC .......................................................... 320/101
See application file for complete search history.

(56) References Cited

U.S. PATENT DOCUMENTS 7,705,490 B2    4/2010    Srinivasan et al.
7,713,649 B2    5/2010    Hickey et al.
(Continued)

OTHER PUBLICATIONS

U.S. Appl. No. 14/566,267, filed Dec. 10, 2014, Bloom Energy Corp.

*Primary Examiner* — Nathaniel R Pelton
(74) *Attorney, Agent, or Firm* — The Marbury Law Group, PLLC (57) ABSTRACT

An electrical power system, including a fuel cell system having a plurality of fuel cell segments and an energy storage system electrically coupled to the fuel cell system. The energy storage system including a plurality of energy storage system technologies, an energy storage system direct current (DC) bus configured to electrically connect the plurality of energy storage system technologies to the fuel cell system, and an energy storage system technologies management system configured manage impedance of the energy storage system and electric coupling of the energy storage system and the fuel cell system.

23 Claims, 7 Drawing Sheets

(51) Int. Cl.
*H01M 16/00* (2006.01)
*H01M 10/46* (2006.01)
*H01M 8/04313* (2016.01)
*H02J 7/34* (2006.01)
*H02J 3/32* (2006.01)
*H02J 1/10* (2006.01)
*H01M 10/42* (2006.01)

(56) References Cited

U.S. PATENT DOCUMENTS

| | | |
|---|---|---|
| 8,263,276 B1 | 9/2012 | Gurunathan et al. |
| 8,535,836 B2 | 9/2013 | Ballantine et al. |
| 2002/0163819 A1* | 11/2002 | Treece .................... F02B 43/10 363/34 |
| 2009/0246596 A1* | 10/2009 | Sridhar ............... B60L 11/1816 429/513 |
| 2012/0098336 A1 | 4/2012 | Gurunathan et al. |
| 2013/0278220 A1* | 10/2013 | Cao .................... H01M 10/4257 320/134 |
| 2013/0279211 A1* | 10/2013 | Green ...................... H02M 7/49 363/35 |
| 2014/0176045 A1* | 6/2014 | Naskali ................. H02J 7/0054 320/103 |
| 2015/0194707 A1* | 7/2015 | Park .................. H01M 10/4207 429/50 |
| 2015/0357820 A1* | 12/2015 | Sugimoto ............. H01M 10/44 307/52 |
| 2016/0141896 A1* | 5/2016 | Brandon ............ H01M 16/003 307/72 |
| 2016/0291683 A1* | 10/2016 | Kacker ................. G06F 1/3212 |
| 2017/0302091 A1* | 10/2017 | Schaedlich ........... H02J 7/0031 |

\* cited by examiner

INTERGRATED FUEL CELL AND ENERGY STORAGE SYSTEMS AND METHOD OF OPERATING THEREOF

RELATED APPLICATIONS

This application claims the benefit of priority to U.S. Provisional Application No. 62/171,145 entitled "Methods of Battery Integration" filed Jun. 4, 2015, the entire contents of which are hereby incorporated by reference.

FIELD

The present disclosure is directed to energy storage systems, such as an integrated energy storage system for a fuel cell power generator system.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their direct current (DC) output into an alternating current (AC).

Operating individual distributed generators, such as fuel cell generators, both with and without a grid reference and in parallel with each other without a grid reference is problematic in that switch-over from current source to voltage source must be accommodated. Additionally, parallel control of many grid independent generators can be problematic. To address the mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. Pat. No. 8,232,676 (filed May 2, 2008 and entitled "Uninterruptible Fuel Cell System"), the disclosure of which is incorporated herein by reference in its entirety for all purposes.

SUMMARY

Embodiments described herein include methods, and systems and apparatuses for implementing such methods for battery integration and applications. Various embodiments may include an electrical power system, including a fuel cell system having a plurality of fuel cell segments and an energy storage system electrically coupled to the fuel cell system. The energy storage system including a plurality of energy storage system technologies, an energy storage system direct current (DC) bus configured to electrically connect the plurality of energy storage system technologies to the fuel cell system, and an energy storage system technologies management system configured manage impedance of the energy storage system and electric coupling of the energy storage system and the fuel cell system.

Other embodiments include a method of integrating a plurality of energy storage system technologies of an energy storage system with a fuel cell system comprises managing impedance of the energy storage system, and managing electric coupling of the energy storage system and the fuel cell system.

DETAILED DESCRIPTION

Figure 1:
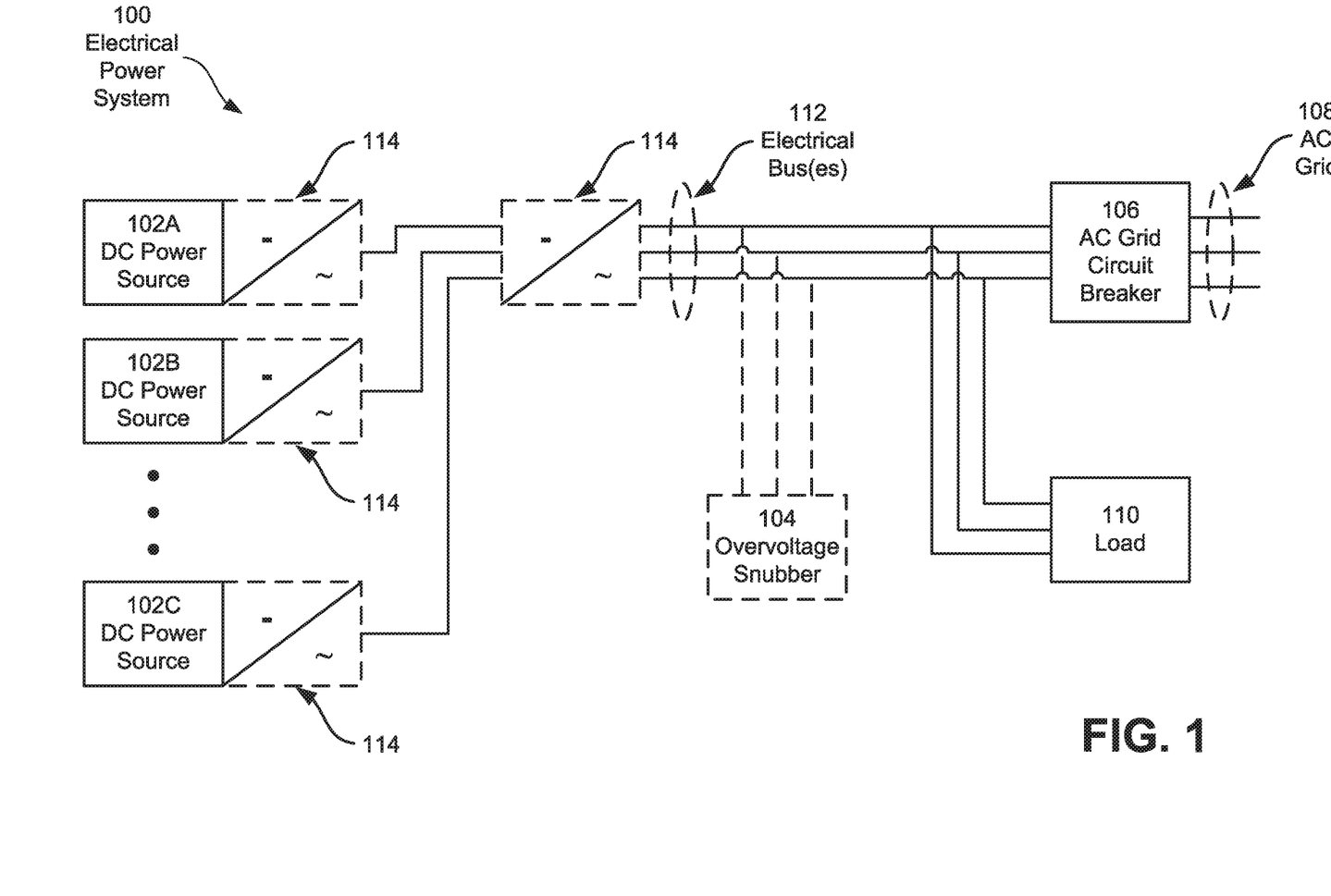
FIG. 1 is a block diagram illustrating a system according to an embodiment.

Referring to FIG. 1, an electrical power system 100 according to an embodiment may include a DC power source 102, an optional overvoltage snubber 104, an AC grid circuit breaker 106, an AC power grid 108, and a load 110. It should be understood that the electrical power system 100 is simplified for ease of explanation, and that the electrical power system 100 may include other components and configurations, such as a DC/AC inverter 114 located in each DC power source 102 and/or on one or more electrical busses 112 between the DC power sources 102 and the optional overvoltage snubber 104. In an embodiment, multiple DC power sources 102A, 102B, and 102C may be connected in parallel to the optional overvoltage snubber 104, the AC grid circuit breaker 106, and the load 110 via one or more of the inverters 114 and electrical busses 112. The DC power sources 102A, 102B, and 102C may be connected to the AC grid 108 via the AC circuit breaker 106. A direct current may be provided by one or more of the DC power sources 102A, 102B, and 102C, which is converted to AC power by the inverter(s) 114 and provided to the load 110 and the AC grid 108. The AC power provided to the load 110 and the AC grid 108 may be divided and distributed to each by various known methods.

The AC grid circuit breaker 106 may electrically connect the AC grid 108 and the electrical bus(es) from the one or more of the DC power sources 102A, 102B, and 102C, and allow the AC power provided from the DC power sources 102A, 102B, and 102C and the inverter(s) 114 to pass to the AC grid 108. In an embodiment, the AC grid circuit breaker 106 may unidirectional (e.g., allowing power to flow to or from the AC grid 108) or bidirectional (e.g., allowing power to flow to and from the AC grid 108). In an embodiment where the AC grid circuit breaker 106 is unidirectional, allowing the power to flow to the AC grid 108, other connections may electrically connect the AC grid 108 to the components of the electrical power system 100. Such other connections may include direct connections or connections via another unidirectional AC grid circuit breaker (not shown) allowing the power to flow from the AC grid 108. The AC grid circuit breaker 106 may be configured to protect the AC grid 108 from damage caused by an overload or a short circuit by detecting a fault condition and interrupting the AC flow. In response to detecting a fault condition, contacts within the AC grid circuit breaker 106 may open to interrupt the circuit connecting the AC grid 108 and one or more of the DC power sources 102A, 102B, and 102C. An open state of the AC grid circuit breaker 106 may indicate that there is no electrical connection to allow the AC flow to the AC grid 108 from one or more of the DC power sources 102A, 102B, and 102C. In an embodiment, the AC grid circuit breaker 106 may be set to an open state manually to stop the AC flow to the AC grid 108, for example for the purpose of conducting maintenance of the AC grid 108. The open AC grid circuit breaker 106 may be set to a closed state, closing the previously opened contacts, to resume the AC flow to the AC grid 108.

As discussed above, some modes of the electrical power system 100 may include one or more of the DC power sources 102A, 102B, and 102C providing DC power to the inverter(s) 114, which in turn provide AC power to the load 110 and the AC grid 108. In such modes of the electrical power system 100, the total AC power provided to the load 110 and the AC grid 108 may be more AC power than the load 110 is configured to handle on its own. During one of these modes of the electrical power system 100, the AC grid circuit breaker 106 may switch from a closed state to an open state disrupting the AC flow to the AC grid 108. The speed with which the AC grid circuit breaker 106 may open may be too quick for the DC power sources 102A, 102B, and 102C to react to their disconnection from the AC grid 108 and reduce their AC power output from the inverter(s) 114 to the electrical power system 100. For example, it may take approximately three cycles before the DC power sources 102A, 102B, and 102C may identify that they are no longer tied to the AC grid 108 and adjust their power output. Without being connected to the AC grid 108, the power meant for the AC grid 108 may flow to the load 110 in addition to the power meant for the load 110. The additional power meant for the AC grid 108 but flowing to the load 110 may increase the total power to the load 110 beyond the load's capacity for handling power. This excess power may damage the load 110.

The optional overvoltage snubber 104 may be connected to the electrical bus(es) 112 between the DC power sources 102A, 102B, and 102C and the load 110. In response to the voltage on the bus(es) 112 increasing above a designated threshold, the optional overvoltage snubber 104 may siphon portions of the AC power from the bus(es) 112 to reduce the amount of AC power flowing to the load 110. The increase in voltage on the bus(es) 112 may be caused by the loss of the electrical connection to the AC grid 108 changing the electrical potential across the electrical power system 100. As will be described in further detail below, the optional overvoltage snubber 104 may step-down and/or dissipate at least some of the excess AC power flowing to the load 110, thereby reducing the total AC power received by the load 110. The optional overvoltage snubber 104 may reduce the AC power to the load 110 as long as the voltage on the bus(es) 112 is above the designated threshold. The DC power sources 102A, 102B, and 102C may adjust their power outputs in response to the loss of connection to the AC grid 108, which may reduce the voltage on the bus(es) 112 below the designated threshold. In response to the voltage on the bus(es) 112 falling below the designated threshold, the optional overvoltage snubber 104 may cease siphoning AC power from the bus(es) 112. The designated threshold may be determined to be a measure of electrical power (e.g. power, voltage, and/or current) coinciding with or less than a limit of electrical power for the load 110 to protect the load 110 from the optional overvoltage.

The above example is described in relation to operating modes of the electrical power system 100 where the DC power sources 102A, 102B, and 102C provide AC power to the load 110 and the AC grid 108. This example is used for ease of explanation, but it should be understood that the optional overvoltage snubber 104 may be employed in a similar manner in the electrical power system 100 for any occurrence of excess AC power flow from one or more of the DC power sources 102A, 102B, and 102C to the load 110.

Figure 2:
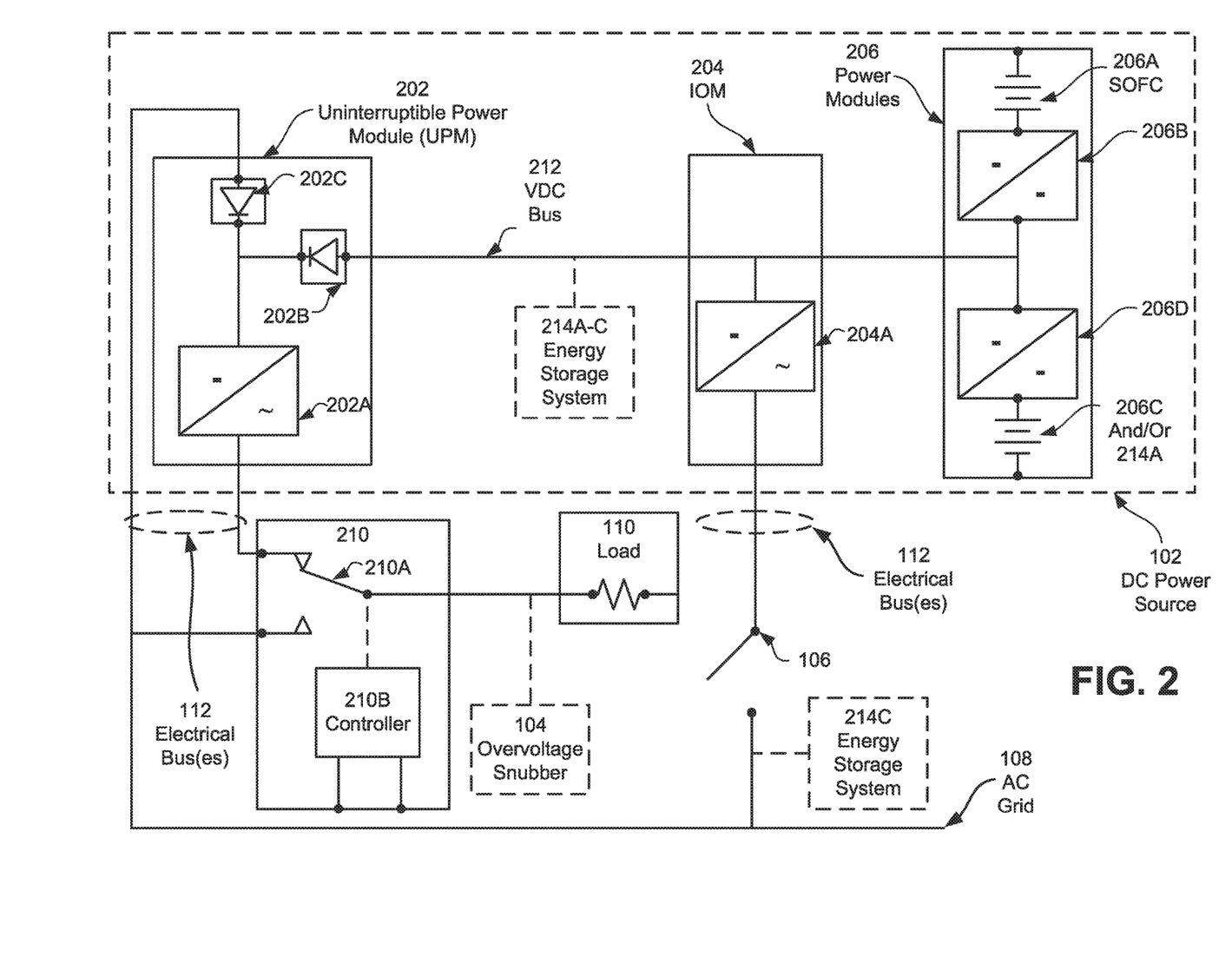
FIG. 2 is a block diagram illustrating a system including an energy storage system according to an embodiment.

FIG. 2 illustrates an embodiment of a fuel cell power generator system which includes the optional overvoltage snubber 104. Referring to FIG. 2, a DC power source 102, such as a fuel cell system, according to an embodiment includes an uninterruptible power module (UPM) 202, an input/output module (IOM) 204, and one or more power modules 206. Preferably, the power module 206 comprises a first housing, the IOM 204 comprises a second housing which is separate from the first housing, and the uninterruptible power module 202 comprises a third housing which is separate from the first and the second housings. If there is more than one power module 206, for example six to ten modules 206, then each power module may comprise its own housing. Each housing may comprise a cabinet or another type of full or partial enclosure, for example the cabinet described in U.S. application Ser. No. 12/458,355, filed on Jul. 8, 2009, and incorporated herein by reference in its entirety. The modules may be arranged in one or more rows or in other configurations.

The UPM 202 includes at least one DC/AC inverter 202A. If desired, an array of inverters may be used. Any suitable inverter known in the art may be used. The UPM 202 optionally contains an input rectifier, such as an input diode 202B which connects to the output of a DC bus 212 from the power module(s) 206 and to the input of the at least one inverter 202A. The UPM also optionally contains a boost PFC rectifier 202C which connects to the output the electric AC grid 108, such as a utility grid, and to the input of the at least one inverter 202A.

The IOM 204 may comprise one or more power conditioning components. The power conditioning components may include components for converting DC power to AC power, such as a DC/AC inverter 204A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated controller device or circuit), etc. The power conditioning components may be designed to convert DC power from the fuel cell power modules to different AC voltages and frequencies. Designs for 208V, 60 Hz; 480V, 60 Hz; 415V, 50 Hz and other common voltages and frequencies may be provided.

Each power module 206 cabinet is configured to house one or more hot boxes. Each hot box contains one or more stacks or columns of fuel cells 206A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators, in addition to or instead of the fuel cell segments.

The segment(s) 206A of fuel cells may be connected to the DC bus, 212 such as a split DC bus, by one or more DC/DC converters 206B located in the power module 206. Alternatively, the DC/DC converters 206B may be located in the IOM 204 instead of the power module 206.

The power module(s) 206 may also optionally include an energy storage device 206C, such as a bank of supercapacitors or batteries. Energy storage device 206C may also be connected to the DC bus 212 using one or more DC/DC converters 206D.

The UPM 202 is connected to an input/output module (IOM) 204 via the DC bus 212. The DC bus receives power from power modules 206.

The fuel cell system (e.g., the DC power source 102) and the AC grid 108 are electrically connected to the load 110 using a chopper unit 210. The load 110 may comprise any suitable load which uses AC power, such as one or more buildings, appliances, lights, tools, air conditioners, heating units, factory equipment and machinery, power storage units, computers, security systems, etc. The chopper unit 210 includes a switch 210A and controller 210B, such as a computer, a logic circuit, or other analog or digital controller device. The switch 210A may be a power semiconductor device (such as a Metal Oxide Semiconductor Field Effect Transistor (MOSFET) or an Insulated Gate Bipolar Transistor (IGBT)), an electrical switch (e.g., a switching circuit) or an electromechanical switch, such as a relay.

The controller 210B routes power to the load 110 either from the UPM 202 or from the AC grid 108 using switch 210A. The at least one fuel cell segment 206A and storage device 206C that from power module 206 are electrically connected in parallel to the at least one first inverter 204A in IOM and to the at least one second inverter 202A in the UPM 202. The at least one first inverter 204A is electrically connected to the load 110 through the electrical AC grid 108 using switch 210A in a first position. In contrast to the circuit shown in U.S. Pat. No. 8,232,676 (filed May 2, 2008 and entitled "Uninterruptible Fuel Cell System"), the AC grid 108 is directly connected to the load 110 through the chopper unit 210 without passing through a bidirectional inverter. The at least one second inverter 202A is electrically connected to the load 110 with the switch 210A in a second position without using the electrical AC grid 108 (i.e., the output of the fuel cell segment 206A does not have to pass through the grid 108 to reach the load 110).

Thus, the controller 210B selects whether to provide power to the load from the electrical grid 108 (or from the fuel cell segment 206A through the AC grid 108) or through the at least one second inverter 202A. The controller 210B may determine a state of the power modules 206 and select a source to power the load 110 based on the state of the power modules 206, as described in U.S. patent application Ser. No. 13/279,921, filed on Oct. 24, 2011, which is incorporated herein by reference in its entirety.

A second switch 106 (e.g., the AC grid circuit breaker shown in FIG. 1) controls the electrical connection between the IOM 204 and the AC grid 108. Switch 106 may controlled by the controller 210B or by another system controller.

By way of illustration and not by way of limitation, the system contains the following electrical paths:

A path to the load 110 from the AC grid 108.

A path from the AC grid 108 through the IOM 204 to storage elements 206C of power modules 206 (for example, supercapacitors or batteries). In some embodiments a portion of the path between the IOM 204 and the AC grid 108 may include the electrical bus(es) 112.

A path from the storage elements 206C of the power modules 206, over the DC bus 212 to the IOM 204 and the UPM 202 in parallel. The DC bus delivers DC to the inverter 202A in the UPM 202 and/or to the inverter 204A in the IOM 204. The inverter 202A in the UPM 202 or inverter 204A in IOM 204 delivers AC power to the load 110 depending on the position of the switch 210A.

A path from the power modules 206 (which may include power from the fuel cell segment(s) 206A and/or the storage elements 206C of the power modules 206), over the DC bus 212 to the IOM 204 and the UPM 202. The DC bus 212 delivers DC voltage to the inverter 202A in the UPM 202 and/or to the inverter 204A in the IOM 204. The inverter 202A in the UPM 202 delivers AC power to the load 110. Power in excess of the power required by the load 110 is delivered to the AC grid 108 through an inverter 204A in the IOM 204. In some embodiments a portion of the path between the UPM 202 and the load 110, and/or the path between the IOM 204 and the AC grid 108 may include the electrical bus(es) 112. The amount of power that is delivered to the AC grid 108 will vary according the demands of the load 110. If the amount of power required by the load 110 exceeds the power provided by the power modules 206, the additional power demand may be supplied by the AC grid 108 directly to the load 110 through switch 210A in the first position or to the UPM 202 with the switch 210A in the second position. The AC grid power is rectified in rectifier 202C in UPM 202 and provided to the inverter 202A in the UPM 202 and converted back to AC for powering the load 110.

The optional overvoltage snubber 104 may be connected on the paths from the power modules 206 to the load 110. As described above, the optional overvoltage snubber may be configured to reduce the magnitude of AC flow to the load 110. Thus, the optional overvoltage snubber 104 may be connected to a circuit path between an AC power source and the load 110. As the electrical power system may deliver AC power to the load via the paths connecting the power modules 206 to the load 110 via the UPM 202, or via the IOM 204 and the AC grid 108, the optional overvoltage snubber 104 may be disposed within the electrical power system such that it may intercept the AC power received by the load 110 via either path. In an embodiment illustrated in FIG. 2, the optional overvoltage snubber 104 may be connected in parallel to a common portion of both paths, between the switch 210A, which may function to merge the paths, and the load 110. In such a configuration, regardless of the path via which the AC is delivered to the load, the optional overvoltage snubber 104 may intercept any excess AC directed toward the load 110.

Figure 3:
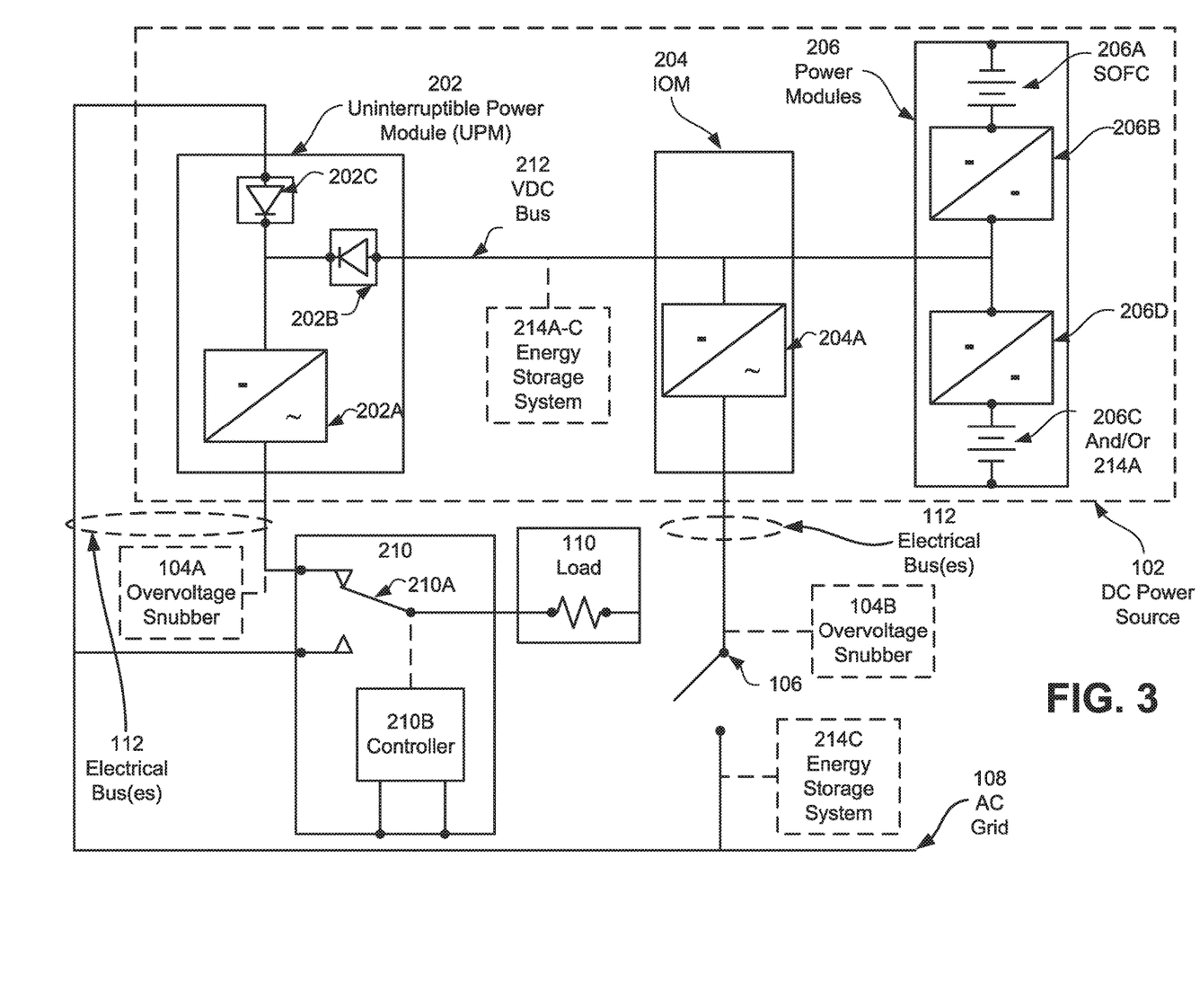
FIG. 3 is a block diagram illustrating a system including an energy storage system according to an embodiment.

Referring to FIG. 3, the DC power source 102, as illustrated in FIG. 2 and described above, may be connected to the load 110 via multiple paths, and respective optional overvoltage snubbers 104A and 104B may be connected to the multiple paths. Rather than a single optional overvoltage snubber 104, as in FIG. 2, multiple optional overvoltage snubbers 104A and 104B may be disposed within the electrical power system to intercept excess AC directed toward the load 110 from the DC power source 102 along different paths. In an embodiment, the DC power source 102 may deliver AC power via a path connecting an output of the IOM 204 to the load 110. For example, DC power may be delivered to the IOM 204 via the DC bus 212, and AC power may be delivered from the IOM 204 to the load 110 via the electrical bus(es) 112 and/or the AC grid 108. Thus, in an embodiment, this path may include the AC grid 108. As described above, the IOM 204 may include an inverter 204A which may convert the DC power provided by the power modules 206 to AC power. Therefore, one optional overvoltage snubber 104B may be connected to this path between the IOM 204 and the load 110 to intercept the excess AC power directed toward the load 110.

In an embodiment, the DC power source 102 may deliver AC power via a path connecting an output of the UPM 202 to the load 110. As described above, the UPM 202 may include an inverter 202A which may convert the DC power provided by the power modules 206 to AC power. The AC power may be delivered from the UPM 202 to the load 110 via the electrical bus(es) 112. Therefore, another optional overvoltage snubber 104A may be connected to this path between the IOM 204 and the load 110 to intercept the excess AC power directed toward the load 110.

The examples described in FIGS. 2 and 3 are meant to be non-limiting. Regardless of the number of paths between the DC power source 102 and the load 110, and the configuration of the DC power source 102, it may be understood that one or more optional overvoltage snubbers 104 should be disposed within the electrical system such that the optional overvoltage snubber(s) 104 are connected between the load 110 and a component for converting the DC power from the DC power source 102 to AC power. This may apply to any number of electrical power systems and circuits. Other examples of the electrical power systems may include those described in U.S. patent application Ser. No. 13/279,921, filed on Oct. 24, 2011, which is incorporated herein by reference in its entirety.

Continuing with the examples in FIGS. 2 and 3, various technologies for energy storage available today, such as batteries (e.g., lead-calcium (Pb—Ca) battery), ultracapacitors, flywheels, and combinations of one or more may be used in energy storage systems 214. Each energy storage system technology provides its unique advantages over others. Combining two or more energy storage system technologies provides combined benefits of the energy storage system technologies. For example, a battery and an ultracapacitor combined energy storage system may provide higher energy storage density from the battery and quick charge/discharge characteristics from the ultracapacitor.

Figure 4A:
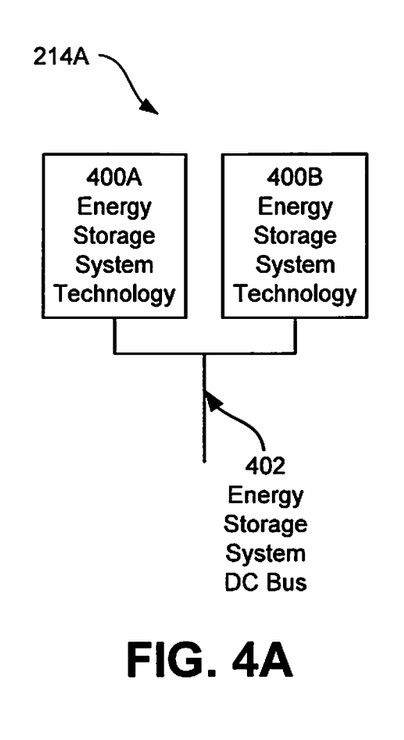
FIGS. 4A-C are block diagram illustrating energy storage systems according to embodiments.
Figure 4B:
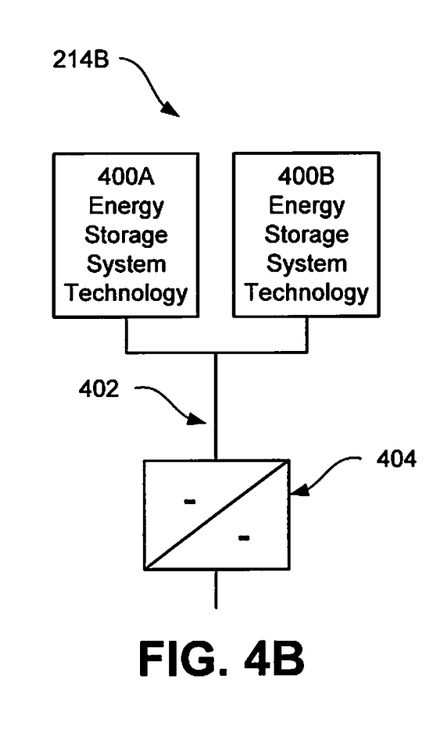
Figure 4C:
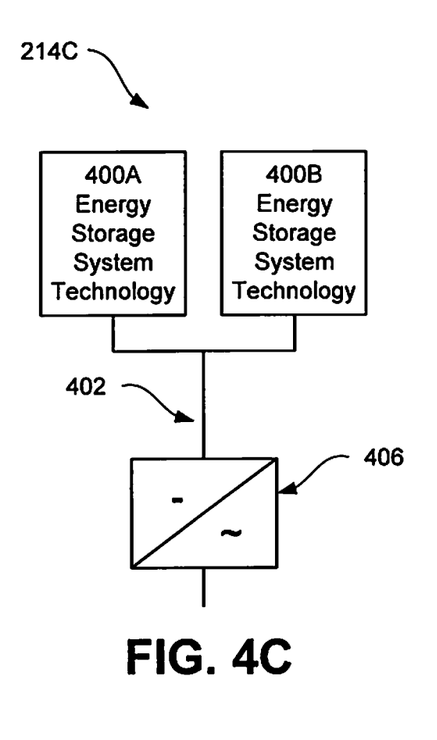

Different energy storage system technologies may be combined electrically as an energy storage system 214 (e.g., 214A, 214B and/or 214C) by various constructions. In an embodiment, the energy storage system technologies 400A and B (e.g., the battery and the ultracapacitor) may be combined by tying the energy storage system technologies 400A and B directly on to a common direct current (DC) bus 402, the common DC bus may be called an energy storage system DC bus 402 (see FIG. 4A). Protection components such as series of a diode and a fuse, or current limiting resistor, may be used to integrate energy storage technologies to the energy storage system DC bus. In an embodiment, the energy storage system technologies 400A and B may be combined by tying the energy storage system technologies 400A and B to a fuel cell system main DC bus (e.g., electrical bus(es) 112 in FIG. 1, bus 212 in FIGS. 2 and 3) through an interface DC-DC electronic module 404 (see FIG. 4B). In an embodiment, the energy storage system technologies 400A and B may be combined by tying the energy storage system technologies 400A and B to a common alternating current (AC) bus (e.g., a grid bus or a critical load bus) (e.g., electrical buses) 112, AC grid 108 in FIGS. 1-3) through an interface DC-AC electronic module 406 (e.g., a DC-AC inverter or a four quadrant inverter) (see FIG. 4C).

Energy may be retrieved from the different energy storage system technologies by various constructions. In an embodiment, energy may be retrieved from the energy storage system technologies by tying the energy storage system DC bus of the energy storage system 214A directly on to the fuel cell system main DC bus 212. Protection components such as a series of a diode and a fuse, or current limiting resistor, may be used to integrate the energy storage system DC bus to fuel cell system main DC bus. In an embodiment, energy may be retrieved from the energy storage system technologies by tying the energy storage system 214B to the fuel cell system main DC bus through the interface DC-DC electronic module 206D. In an embodiment, energy may be retrieved from the energy storage system technologies by tying the energy storage system 214C to the common AC bus through the interface DC-AC electronic module 202A. 204A.

Different energy storage system technologies may be charged by various constructions. In various embodiments, the energy storage system technologies may be charged from energy generated in fuel cells, rectified grid AC voltage, natural gas energy, solar energy, wind energy, or any other renewable or alternative energy sources. In various embodiments, the energy storage system technologies may be charged from any combination of energy storage system technologies. A charging DC bus can be the same as or separated from the energy storage system DC bus. In an embodiment, the energy storage system technologies may be used to charge each other, such as when one of the energy storage system technologies is a battery and another is a renewable energy source. The energy storage system technology based on a renewable energy source may charge the battery when sufficient energy is produced to adequately support the functions of the energy storage system and charge the battery.

An energy storage system technologies management system may manage AC and DC impedance of the energy storage system and a circuit to manage electric coupling of the energy storage system and the circuit to which it is connected, such as the fuel cell system main DC bus. Fuel cell modules, to which the energy storage system may couple, may be divided into sections. The energy storage system technologies management system may manage impedance with switching of resistance to control coupling of the energy storage system to the circuit and different sections of fuel cell modules.

In an embodiment, the energy storage system technologies management system may be included for health monitoring of the energy storage system technologies. In an embodiment, the energy storage system technologies management system may interleave perturbation signals to reduce voltage ripples as well as power losses in a battery, thus improving life of the battery. In an embodiment, during cold weather conditions the energy storage system technologies management system may adjust these signals to remove interleaving phase difference so that added up AC signals will increase losses in a battery, thus increasing internal temperature of the battery. In an embodiment, the energy storage system technologies management system may create an AC ripple perturbation at total system level as well as up to cell level. This may help to identify the location of problematic cells in energy storage system. Coupling the energy storage system to multiple fuel cell modules may also cause current rippling through the energy storage system technologies (e.g., a battery). In an embodiment, the energy storage system technologies management system may compare current readings of the energy storage system technologies to determine which of the energy storage system technologies in the of the energy storage system is weaker. In an embodiment the energy storage system technologies management system may briefly discharge the energy storage system technologies while charging to evaluate the health of the energy storage system technologies. An ultracapacitor may be used to check a transience in a current during the discharge.

The energy storage system may be used to provide peak load support. The energy storage system may be used to follow a customer load profile. The energy storage system may charge during off-peak conditions (e.g., night time and weekends) and may discharge during peak load hours (e.g., day time). A true load following logic of the energy storage system may help minimize peak load charges, such as demand charges from utilities. In an embodiment, the energy storage system may charge from a utility grid and/or another power source, such as energy generated in fuel cells, natural gas energy, solar energy, wind energy, or any other converted renewable or alternative energy sources. Charging from any of the non-grid energy sources may allow the energy storage system to charge without regard to the peak load conditions of the utility grid, and to charge while causing low carbon dioxide emissions. The fuel cell modules may be used in conjunction with the energy storage system to provide energy to a load and provide peak load support in the same manner as described above. When and how much to use the energy storage system and/or fuel cell modules during peak and off peak hours may depend, at least in part, on the health of the energy storage system and/or fuel cell modules. Healthy fuel cell modules may prompt load cycling with more of the energy provided by the fuel cell modules and less energy from the energy storage system, which may be more efficient and reduce the life-cycle cost of the energy storage system. Weak fuel cell modules may prompt load cycling with less of the energy provided by the fuel cell modules and more energy from the energy storage system, which may increase the life-cycle cost of the energy storage system.

The energy storage system may be used to provide for emergency power consumption. A number of thermal cycles of a fuel cell system may have a profound effect its life, so manufacturers should minimize the number of thermal cycles whenever possible. One way to avoid thermal cycles may be to keep the electrical power output from a fuel cell at a constant value. This may be achieved by temporarily consuming energy from the fuel cell during grid events or sudden step down loads. At other times, the current solution for keeping the electrical power output from a fuel cell at a constant value is to waste that energy in heat form. However, this energy can be used to charge the energy storage system. The energy storage system may be kept at slightly less than its full charged condition (e.g., at or about 90% capacity) so that energy during emergency conditions can be used to dump into the partially charged energy storage system.

The energy storage system may be used to provide for an energy buffer for load transients and over load conditions. The energy storage system may be used as an energy buffer during load transients in fuel cell systems. This way a fuel cell system and the energy storage system may be designed for full load following during normal operating states as well as during abnormal conditions like overload and high inrush currents.

The energy storage system may be used to provide grid support functions. Energy storage in the energy storage system may be used to support several advanced grid support features to improve utility grid stability and reliability. In various embodiments, the grid support functions may include additional active power (in units of kilowatt, kW) during under frequency conditions, and additional active power and reactive power (in units of kilovolt amps reactive, kVAR) during undervoltage conditions.

The energy storage system may be used to provide a support load during maintenance. The energy storage system can be used as a redundant power source during fuel cell module or other electronics replacement.

The energy storage system may be used for black start applications (e.g., where grid power is not available). Energy stored in energy storage system may be used to black start the fuel cell system (i.e., starting the fuel cell system using its own power output without relying on external electric power). This may eliminate the dependency on the grid or weather conditions so the system can start independently even at remote locations with unstable power supplies.

The energy storage system may use historical information for the above functions to apply machine learning for determining power factor and load profiles that may be used to provide the functions in support of the utility grid and/or fuel cells. The energy storage system may track the power of the grid for implementing its functions or for gathering historical data by readings taken from multiple interface DC-DC electronic modules and/or interface DC-AC electronic modules connected to the energy storage system technologies.

In an embodiment, the energy storage system may combine an inconsistent energy storage system technology (e.g., solar energy) and a consistent energy storage system technology (e.g., a battery), such that the energy storage system may use the consistent energy storage system technology to smooth the energy provided by inconsistent the energy storage system technology.

Figure 6A:
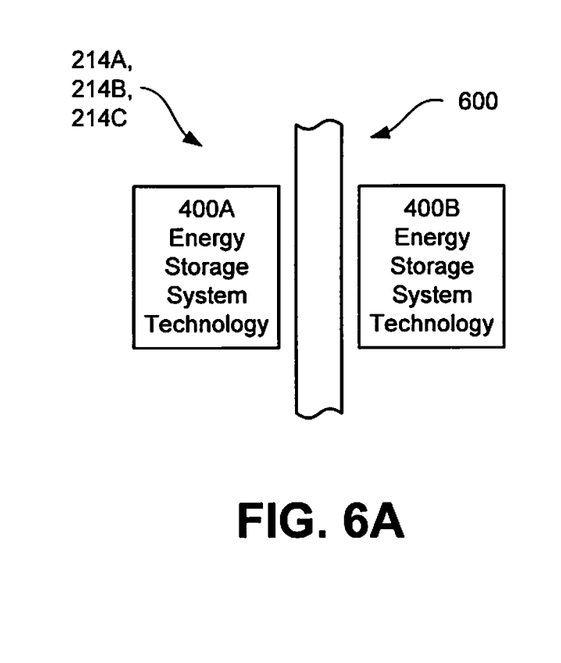
FIGS. 6A and 6B are block diagram illustrating energy storage systems according to embodiments.
Figure 6B:
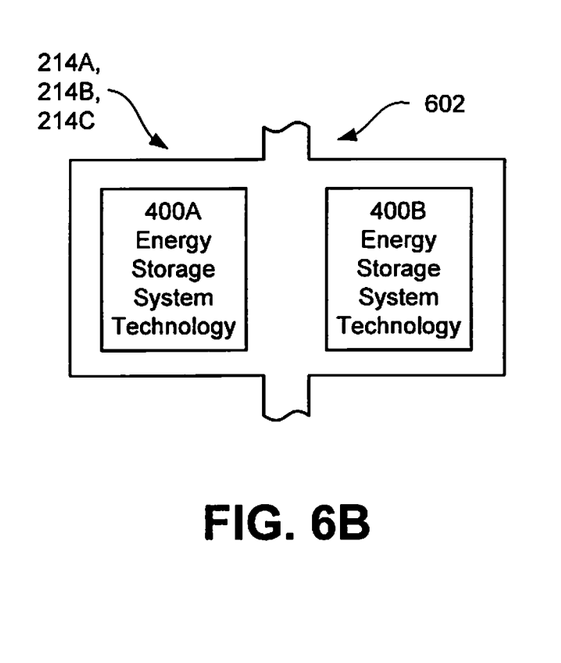

In an embodiment, such as the examples illustrated in FIGS. 6A and 6B, exhaust (e.g., containing carbon dioxide) from the fuel cell modules may be used to warm the energy storage system technologies (e.g., battery) via exhaust conduits 600, 602, such as exhaust risers and/or exhaust manifolds. In a circumstance when maintenance of the energy storage system technologies is to be performed, a fresh air bypass stream is provided to the energy storage system technologies to replace the circulation of exhaust with fresh air.

Figure 7:
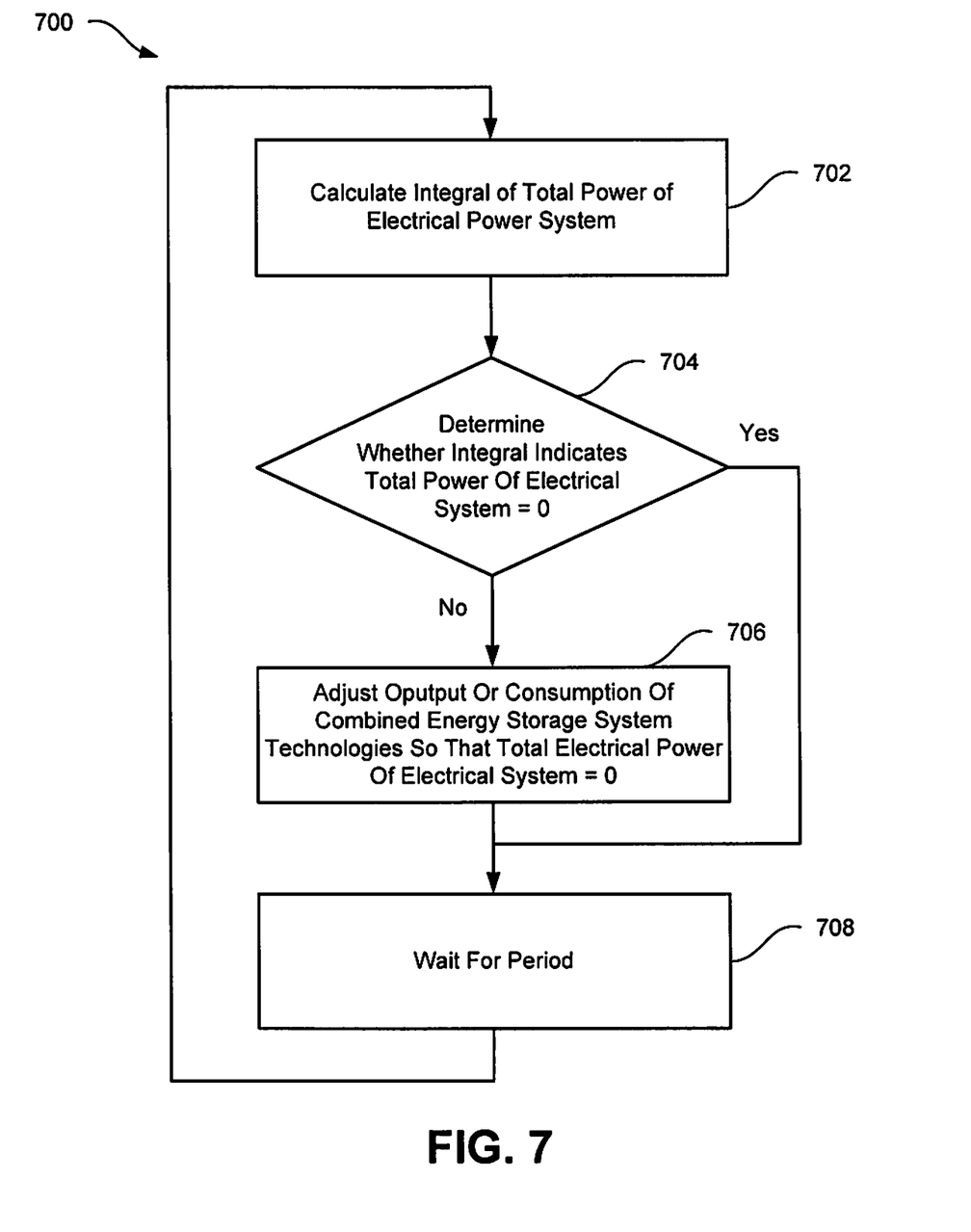
FIG. 7 is a process flow diagram illustrating an example method of ensuring that a net power over a certain period of time in an electrical power system is zero according to embodiments.

In an embodiment, such as the example method 700 illustrated in FIG. 7, the energy storage system may periodically (block 708) ensure that the net power over a certain period of time (e.g., 15 minutes) in the electrical power system 100 is zero, e.g., power=0=fuel cell power output+ combined energy storage system technologies (e.g., solar energy and batteries) power output and/or consumption load power consumption (determination block 704 and block 706). An estimator may calculate the integral of the total power of the electrical power system 100 to determine whether the net power is zero (block 702).

Figure 5:
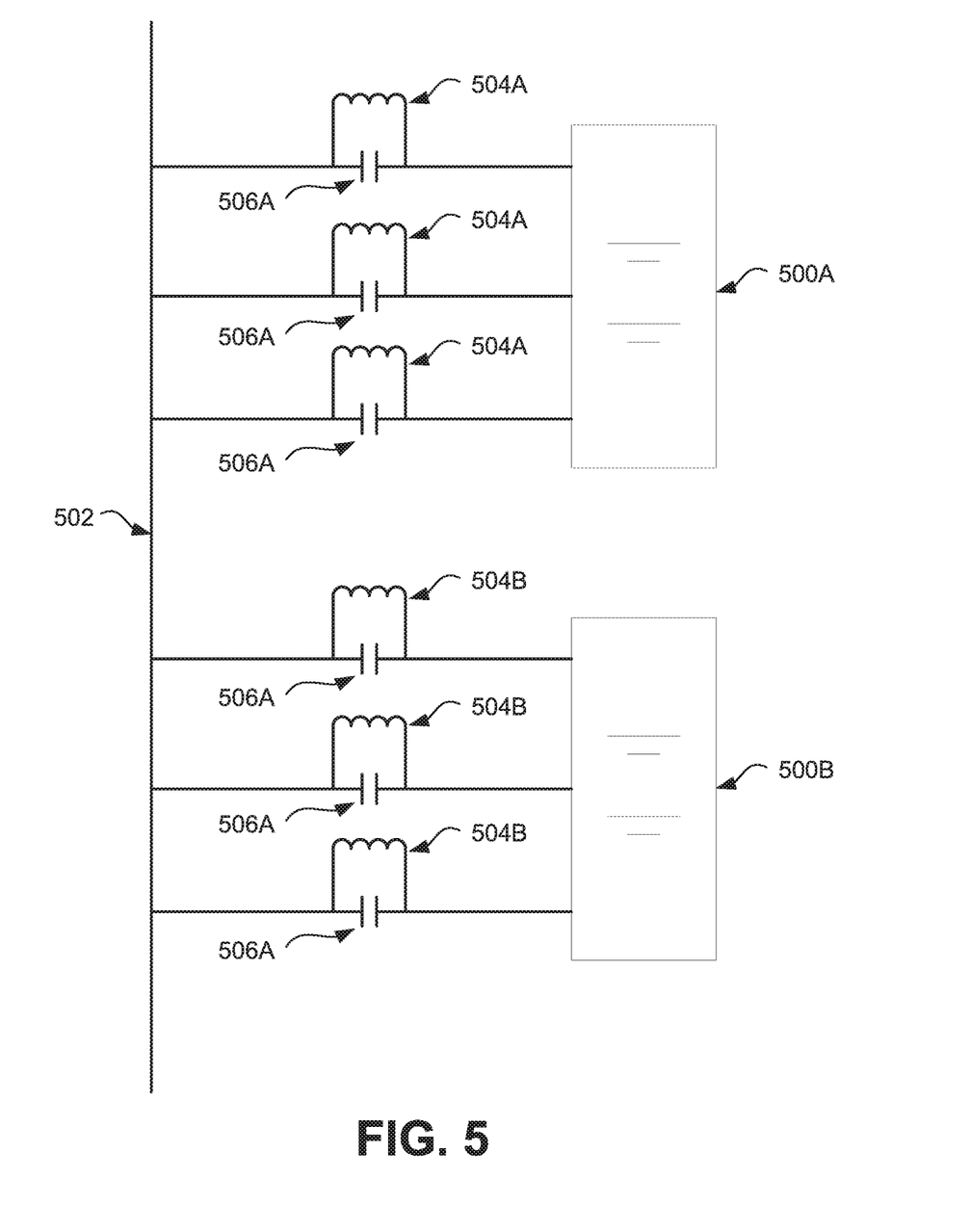
FIG. 5 is a block diagram illustrating multiple sets of batteries connected to a common bus according to an embodiment.

In an embodiment, impedance of energy storage system technologies (e.g., battery) may be determined without interfacing the DC-DC electronic module. As illustrated in FIG. 5, multiple sets of batteries 500A may be connected to a common bus 502. Each set of batteries 500A and B may be connected to the common bus 502 by an inductor 504A and B or resistor connected in parallel with a capacitor 506A and B. A cancelling ripple may be applied to the batteries 500A and B. The cancelling ripple may be applied using alternating impedance from the inductors 504A and B or resistors connected in parallel with the capacitors 506A and B connected to each battery 500A and B, so that the ripple on a middle bus is or is near zero. The impendence of each battery may then be measured.

In an embodiment, the functions of the energy storage system, energy storage system technologies, and the energy storage system technologies management system may be implemented in software, hardware, firmware, on any combination of the foregoing. In an embodiment, the hardware may include circuitry designed for implementing the specific functions of the energy storage system, energy storage system technologies, and/or the energy storage system technologies management system. In an embodiment, the hardware may include a programmable processing device (e.g., controller 210B in FIGS. 2 and 3) control configured with instructions to implement the functions of the energy storage system, energy storage system technologies, and/or the energy storage system technologies management system.

In an embodiment, various energy storage system technologies may be housed in separate cabinets. In an embodiment, each cabinet may include a fire suppression device or system. In an embodiment, space between adjacent cabinets may be filled with a material having a high thermal mass and may be inert (e.g., alumina powder) to provide thermal insulation between the cabinets. The material may also be placed between the cabinets and a structure housing the cabinets to provide thermal insulation from the structure.

The above described methods and systems can be readily used with multiple generators in parallel with a large load, while allowing tight control of frequency and voltage.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An electrical power system, comprising:
a fuel cell system having a plurality of fuel cell segments; and
an energy storage system electrically coupled to the fuel cell system, comprising:
a plurality of energy storage system technologies including a first energy storage system technology of a first type and a second energy storage system technology of a second type different from the first type;
an energy storage system direct current (DC) bus configured to electrically connect the plurality of energy storage system technologies to the fuel cell system, wherein the first energy storage system technology is coupled to the energy storage system DC bus via a first capacitor and a first inductor or resistor, and the second energy storage system technology is coupled to the energy storage system DC bus via a second capacitor and a second inductor or resistor, wherein the first capacitor and the first inductor or resistor are electrically connected in parallel between the first energy storage system technology and the energy storage system DC bus, and the second capacitor and the second inductor or resistor are electrically connected in parallel between the second energy storage system technology and the energy storage system DC bus; and
an energy storage system technologies management system configured to alternate impedance of at least one of the first inductor or the resistor or the second inductor or resistor to apply a cancelling ripple to the at least one of the first or second energy storage system technologies, measure impedance of the energy storage system and modify electric coupling of the energy storage system and the fuel cell system based on the measured impedance of the energy storage system.

2. The electrical power system of claim 1, wherein the energy storage system further comprises an interface DC-DC electronic module electrically connected to the energy storage system DC bus and configured to electrically connect the plurality of energy storage system technologies to the fuel cell system.

3. The electrical power system of claim 1, wherein the energy storage system further comprises an interface DC-alternating current (AC) electronic module electrically connected to the energy storage system DC bus and configured to electrically connect the plurality of energy storage system technologies to the fuel cell system via an AC bus.

4. The electrical power system of claim 3, wherein:
the interface DC-AC electronic module comprises one of a DC-AC inverter or a four quadrant inverter; and
the AC bus comprises one of a grid bus and a critical load bus.

5. The electrical power system of claim 1, wherein:
the first energy storage system technology of the first type comprises one of a battery and an ultracapacitor; and
the second energy storage system technology of the second type comprises another one of the battery and the ultracapacitor.

6. The electrical power system of claim 5, wherein the first energy storage system technology is configured to charge the second energy storage system technology.

7. The electrical power system of claim 1, wherein the energy storage system is configured to provide energy from the plurality of energy storage system technologies to the fuel cell system and charge the plurality of energy storage system technologies using energy provided by at least one of the fuel cell system, an alternating current (AC) grid, a renewable energy source, and an alternative energy source.

8. The electrical power system of claim 1, wherein the energy storage system is configured to provide energy to a load in conjunction with the fuel cell system providing energy to the load depending, at least in part, on a health of the electrical power system.

9. The electrical power system of claim 8, wherein the health of the electrical power system depends at least in part on at least one of a health of the plurality of energy storage system technologies and a health of the plurality of fuel cell segments.

10. The electrical power system of claim 9,
wherein the health of the plurality of fuel cell segments indicates healthy fuel cell segments, the energy storage system is configured to load cycle with less energy provided from the plurality of energy storage system technologies than an energy provided by the fuel cell segments; and
wherein the health of the plurality of fuel cell segments indicates weak fuel cell segments, the energy storage system is configured to load cycle with more energy provided from the plurality of energy storage system technologies than the energy provided by the fuel cell segments.

11. The electrical power system of claim 1, wherein:
the energy storage system is configured to keep the plurality of energy storage system technologies at less than full charge; and
the plurality of energy storage system technologies are configured to consume energy from the fuel cell system during an emergency condition.

12. The electrical power system of claim 1, wherein the energy storage system is configured to provide energy from the plurality of energy storage technologies to black start the fuel cell system.

13. The electrical power system of claim 1, wherein:
the first energy storage system technology is a battery used for providing higher energy storage density than the second energy storage technology; and
wherein the second energy storage system technology is an ultracapacitor used for providing quicker charge or discharge characteristics than the battery.

14. The electrical power system of claim 1, wherein the first energy storage system technology is coupled to the energy storage system DC bus via the first capacitor and the first inductor, and the second energy storage system technology is coupled to the energy storage system DC bus via the second capacitor and the second inductor.

15. The electrical power system of claim 1, wherein the first energy storage system technology is coupled to the energy storage system DC bus via the first capacitor and the first resistor, and the second energy storage system technology is coupled to the energy storage system DC bus via the second capacitor and the second resistor.

16. A method of integrating a plurality of energy storage system technologies of an energy storage system with a fuel cell system, comprising:
    alternating impedance of at least one of a first inductor or resistor connected in parallel with a first capacitor between a first energy storage system technology and the fuel cell system, or a second inductor or resistor connected in parallel with a second capacitor between a second energy storage system technology and the fuel cell system;
    applying a cancelling ripple to the at least one of the first or second energy storage system technologies;
    measuring an impedance of the energy storage system, wherein the energy storage system comprises the first energy storage system technology of a first type coupled to a DC bus of the energy storage system via the first capacitor and the first inductor or resistor and a second energy storage system technology of a second type coupled to the DC bus of the energy storage system via the second capacitor and the second inductor or resistor, wherein the second type is different from the first type; and
    modifying an electrical coupling of the energy storage system and the fuel cell system based on the measured impedance of the energy storage system.

17. The method of claim 16, wherein modifying the electrical coupling of the energy storage system and the fuel cell system comprises:
    electrically coupling the plurality of energy storage system technologies to the fuel cell system via an interface DC-DC electronic module.

18. The method of claim 16, further comprising:
    providing energy from the plurality of energy storage system technologies to the fuel cell system; and
    charging the plurality of energy storage system technologies using energy provided by at least one of the fuel cell system, an alternating current (AC) grid, a renewable energy source, and an alternative energy source.

19. The method of claim 16, further comprising providing energy from the energy storage system to a load in conjunction with the fuel cell system providing energy to the load depending, at least in part, on at least one of a health of the plurality of energy storage system technologies and a health of the plurality of fuel cell segments;
    wherein the health of the plurality of fuel cell segments indicates healthy fuel cell segments, the method further comprising load cycling the energy storage system with less energy provided from the plurality of energy storage system technologies than an energy provided by the fuel cell segments; and
    wherein the health of the plurality of fuel cell segments indicates weak fuel cell segments, the method further comprising load cycling the energy storage system with more energy provided from the plurality of energy storage system technologies than the energy provided by the fuel cell segments.

20. The method of claim 16, further comprising:
    keeping the plurality of energy storage system technologies at less than full charge; and
    consuming energy from the fuel cell system by the plurality of energy storage system technologies during an emergency condition.

21. The method of claim 16, wherein:
    the first energy storage system technology is a battery used for providing higher energy storage density than the second energy storage technology; and
    wherein the second energy storage system technology is an ultracapacitor used for providing quicker charge or discharge characteristics than the battery.

22. The method of claim 16, wherein the first inductor is connected in parallel with the first capacitor between the first energy storage system technology and the fuel cell system, and the second inductor is connected in parallel with the second capacitor between the second energy storage system technology and the fuel cell system.

23. The method of claim 16, wherein the first resistor is connected in parallel with the first capacitor between the first energy storage system technology and the fuel cell system, and the second resistor is connected in parallel with the second capacitor between the second energy storage system technology and the fuel cell system.

* * * * *